United States Patent Office 3,396,179
Patented Aug. 6, 1968

3,396,179
PROCESS FOR THE PREPARATION OF STEROIDAL
6-HALOMETHYL-4,6-DIEN-3-ONES
Derek Burn, Robert Victor Coombs, and Vladimir Petrow,
London, England, assignors to The British Drug Houses
Limited
No Drawing. Filed May 12, 1966, Ser. No. 549,473
Claims priority, application Great Britain, May 18, 1965,
20,936/65; June 18, 1965, 25,841/65
8 Claims. (Cl. 260—397.4)

ABSTRACT OF THE DISCLOSURE

This invention is for improvements in or relating to organic compounds and has particular reference to a new and improved process for the preparation of steroidal 6-halomethyl-4,6-dien-3-ones. The process comprises treating a corresponding steroidal 6-methylen-4-en-3-one with a hypohalous acid.

Our copending application No. 523,247 filed on Jan. 27, 1966 discloses 6-halomethyl-3-oxo-4,6-dienic steroids including the partial formula

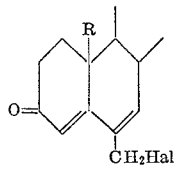

(I)

where R is hydrogen or methyl and Hal is chlorine, bromine or iodine and a process for their preparation comprising treating a corresponding 6-hydroxymethyl-3-oxo-4,6-dienic steroid with a halogenating agent. As described in our copending application No. 523,247 filed on Jan. 27, 1966 the 6-halomethyl-3-oxo-4,6-dienic steroids may possess anabolic, androgenic, gonadotrophin-inhibiting, claudogenic, progestational, ovulation-inhibiting, anti-inflammatory or anti-endotoxic properties.

We have now discovered that the steroidal 6-halomethyl-4,6-dien-3-ones may be obtained by treating steroidal 6-methylen-4-en-3-ones including the partial Formula II below with a hypohalous acid.

This discovery represents an important technological advance over the previous method in that it employs the more readily available 6-methylenic steroids as starting materials.

According to the present invention, there is provided a process for the preparation of steroidal 6-halomethyl-4,6-dien-3-ones including the partial formula

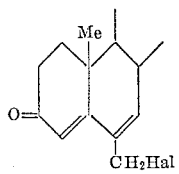

(I)

where Hal is chlorine, bromine or iodine which process comprises reacting the corresponding steroidal 6-methylen-4-en-3-one including the partial formula

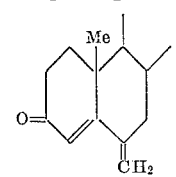

(II)

with a hypohalous acid.

The hypohalous acid is conveniently generated in situ. Thus the 6-methylen-4-en-3-one may be dissolved or suspended in a suitable organic solvent, which may be miscible with water or may be admixed with water such, for example, as a lower aliphatic ketone, dioxan or acetic acid, and treated with not less than 1 molar equivalent of an N-halo-imide or -amide in the presence of a strong acid. Suitable N-halo compounds include the N-chloro, N-bromo and N-iodo derivatives of such amides and imides as acetamide and succinimide, and such compounds as isocyanuric chloride and bromide and N-bromocaprolactam. The preferred acid is perchloric acid, but other strong acids such, for example, as sulphuric acid and toluene-p-sulphonic acid may also be employed.

The reaction is conveniently carried out at or near room temperature, under which conditions the reaction with the N-chloro-amides and imides is generally complete within 24 hours. The N-bromo-amides and imides generally react more rapidly and within 6 hours, whilst the N-iodo-amides and imides generally need less than 3 hours. The reactions may be followed by physico-chemical techniques, such for example as U.V. spectroscopy. In general it is advantageous to work-up the products of the reaction, as soon as the reaction is complete. At the completion of the reaction, the mixture may be poured into water and the steroidal material isolated by filtration or extraction and thereafter purified by conventional techniques.

When used as intermediates, if so desired, it is generally unnecessary to purify the 6-halomethyl product which may be used direct.

The process of the present invention may be applied to a wide variety of steroidal 6-methylen-4-en-3-ones of the androstane, pregnane and D-homopregnane series which may additionally be substituted by:

Hydroxyl, alkoxyl and acyloxy groups in Rings C and D and in the side chain. As will be apparent to those skilled in the art, hydroxyl groups may be attacked during the process of the present invention and in such cases may be protected by prior conversion into, for example, acyl derivatives. In particular, the corticoidal 17α,21-dihydroxy-20-ketone side-chain may be protected by, for example, conversion into the corresponding 17α,20:20,21-bismethylenedioxy derivative or the 17α,21-diacyl derivatives.

Carbonyl groups, for example in such positions as 11, 12, 15, 16, 17 and 20.

Carbalkoxyl groups, for example in such positions as 13, 16, 17, 20, including pregnanoic acids.

Cyano groups, for example in such positions as 13, 16 and 17.

Alkyl groups, and in particular methyl groups at 1, 2, 8, 9, 11, 12, 14, 15, 16, 17, 18, 19 and 21, ethyl groups at 17, and haloalkyl, alkoxyalkyl and cyanoalkyl groups at 16.

Methylene, halomethylene and ethylidene groups, for example in such positions as 16 when a 17α-acyloxy-20-ketone system is also present.

Halogen atoms, and in particular fluorine and chlorine at 9, 11, 15, 16, 18, 19, 20 and 21.

Spirolactone side-chains attached at 17.

Spiroketal side-chains attached to Ring D.

The starting materials of the present invention namely the 6-methylene-3-oxo-Δ⁴-steroids and processes for their preparation are described in our British patent specifications Nos. 929,985 and 944,050 and in U.S. Patent No. 3,159,643 issued Dec. 1, 1964.

Following is a description by way of example of methods of carrying the invention into effect.

EXAMPLE 1

17α-acetoxy-6-chloromethyl-16-methylenepregna-4,6-diene-3,20-dione

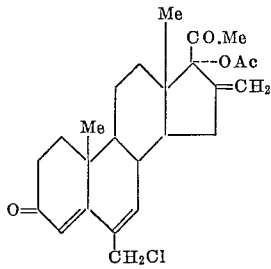

A suspension of 17α-acetoxy-6,16-bismethylenepregn-4-ene-3,20-dione (1 g.) and N-chlorsuccinimide (0.65 g.) in dioxan (40 ml.) and water (5 ml.) containing 60% perchloric acid (0.3 ml.) was stirred overnight at room temperature. The clear solution was poured into an ice-cold dilute solution of sodium bicarbonate and the precipitated solid was crystallised from dichloromethane-methanol to give 17a-acetoxy-6-chloromethyl-16-methylenepregna-4,6-diene-3,20-dione as prisms, M.P. 242° C., decomp. $[\alpha]_D^{25}$—128.6° (c., 1.0 in chloroform), $\lambda_{max}$. 279 mμ (ε, 23,100).

EXAMPLE 2

17α-acetoxy-6-bromomethyl-16-methylenepregna-4,6-diene-3,20-dione

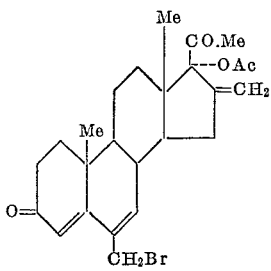

A suspension of 17α-acetoxy-6,16-bismethylenepregn-4-ene-3,20-dione (6 g.) and N-bromsuccinimide (4 g.) in dioxan (170 ml.) and water (30 ml.) containing 60% perchloric acid (2 ml.) was stirred at room temperature for 2 hours. The product, isolated as in Example 1, crystallised from dichloromethane-methanol to give 17α-acetoxy-6-bromomethyl - 16 - methylenepregn - 4,6 - diene 3,20-dione as prisms M.P. 199° C. decomp. $[\alpha]_D^{19}$—116.9° (c., 1.05 in chloroform), $\lambda_{max}$. 281 mμ (ε, 21,400).

EXAMPLE 3

The process of Example 2 was repeated substituting N-bromacetamide (3 g.) for N-bromsuccinimide.

The product, M.P. 199° C., decomp., was 17α-acetoxy - 6 - bromomethyl - 16 - methylenepregna - 4,6-diene-3,20-dione, identical with that obtained in Example 2.

EXAMPLE 4

17α-acetoxy-6-chloromethylpregna-4,6-diene-3,20-dione

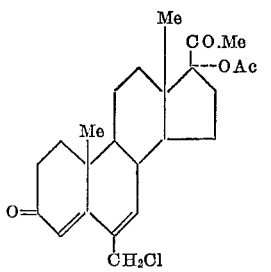

A suspension of 17α-acetoxy-6-methylenepregn-4-ene-3,20-dione (3 g.) and N-chlorsuccinimide (2.05 g.) in dioxan (85 ml.) and water (15 ml.) containing 60% perchloric acid (1 ml.) was stirred at room temperature for 9 hours. The product, isolated as in Example 1, was crystallised from dichloromethane-methanol to give 17α-acetoxy-6-chloromethylpregna-4,6 - diene - 3,20 - dione as prisms, M.P. 171° C., decomp. $[\alpha]_D^{24}$+1.9° (c., 0.9 in chloroform) $\lambda_{max}$. 280 mμ (ε 23,300).

EXAMPLE 5

17α-acetoxy-6-bromomethylpregna-4,6-diene-3,20-dione

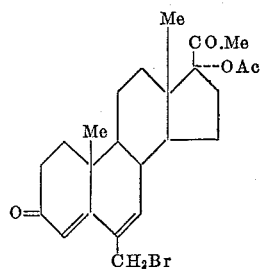

A suspension of 17α-acetoxy-6-methylenepregn-4-ene-3,20-dione (3.1 g.) and N-bromsuccinimide (2.05 g.) in dioxan (85 ml.), water (15 ml.) and 60% perchloric acid (1 ml.) was stirred at room temperature for 4 hours. The product, isolated as in Example 1, was crystallised from acetone-hexane to give 17α-acetoxy-6-bromomethyl-pregna-4,6-diene-3,20-dione as plates, M.P. 141° C., $[\alpha]_D^{23}$—23.1° (c., 0.4 in chloroform), $\lambda_{max}$. 282 mμ (ε, 22,300).

EXAMPLE 6

17β-acetoxy-6-bromomethylandrosta-4,6-dien-3-one

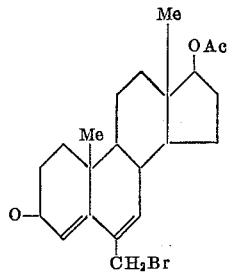

A solution of 17β-acetoxy-6-methyleneandrost-4-3-one (3 g.) and N-bromsuccinimide (2 g.) in dioxan (42 ml.), water (8 ml.) and 60% perchloric acid (0.5 ml.) was kept at room temperature for 2 hours. The product, isolated as in Example 1, was crystallised from aqueous methanol to give 17β-acetoxy-6-bromomethylandrosta-4,6-dien-3-one as laths, M.P. 123° C., $[\alpha]_D^{23}$—13.4° (c., 0.5 in chloroform), $\lambda_{max}$. 282 mμ (ε, 21,400).

EXAMPLE 7

17β-acetoxy-6-chloromethylandrosta-4,6-dien-3-one

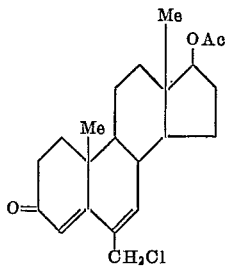

A mixture of 17β-acetoxy-6-methyleneandrost-4-en-3-one (6 g.), N-chlorsuccinimide (3.5 g.), dioxan (85 ml.), water (15 ml.) and 60% perchloric acid (1.5 ml.) was stirred overnight at room temperature. The product, isolated as in Example 1, was crystallised from acetone-hexane to give 17β-acetoxy-6-chloromethylandrosta-4,6-dien-3-one as prisms, M.P. 138–139° C., $[\alpha]_D^{23}$+6° (c., 1.2 in chloroform), $\lambda_{max}$. 280.5 mμ (ε, 22,000).

EXAMPLE 8

17β-acetoxy-6-isodomethylandrosta-4,6-dien-3-one

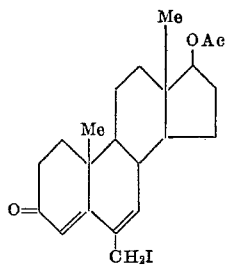

A mixture of 17β-acetoxy-6-methyleneandrost-4-en-3-one (1 g.), N-iodosuccinimide (0.8 g.), dioxan (25 ml.), water (5 ml.) and 60% perchloric acid (0.2 ml.) was stirred at room temperature from 30 minutes. The product, isolated as an Example 1, was crystallised from ether-hexane to give 17β-acetoxy-6-iodomethylandrosta-4,6-dien-3-one as needles. M.P. 138–139° C., $[\alpha]_D^{24}$—63° (c., 1.0 in chloroform), $\lambda_{max.}$ 278 mμ ($\epsilon$, 20,100).

EXAMPLE 9

17α-acetoxy-6-iodomethyl-16-methylenepregna-4,6-diene-3,20-dione

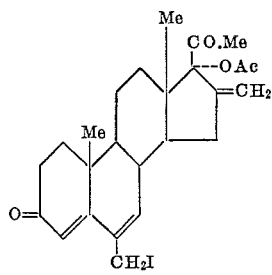

A suspension of 17α-acetoxy-6,16-bismethylenepregn-4-ene-3,20-dione (4 g.) and N-iodosuccinimide (3.5 g.) in dioxan (140 ml.), water (25 ml.) and 70% perchloric acid (1.75 ml.) was stirred at room temperature for 30 minutes. The product, isolated as in Example 1, was crystallised from acetone to give 17α-acetoxy-6-iodomethly-16-methylene-pregna-4,6-diene-3,20-dione as rods, M.P. 152–154° C., decomp., $[\alpha]_D^{24}$—146.9° (c., 0.3 in chloroform), $\lambda_{max.}$ 284 mμ ($\epsilon$, 20,000).

EXAMPLE 10

6-chloromethyl-16α,17α-isopropylidenedioxypregna-4,6-diene-3,20-dione

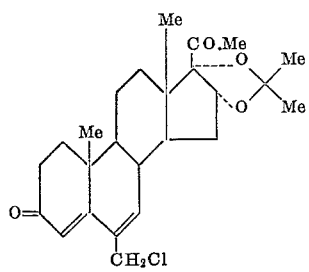

A suspension of 16α,17α-isopropylidenedioxy-6-methylenepregn-4-ene-3,20-dione (1.5 g.) and N-chlorosuccinimide (1 g.) in dioxan (42 ml.), water (8 ml.) and 60% perchloric acid (0.4 ml.) was stirred overnight at room temperature. The product, isolated as in Example 1, was crystallised from aqueous acetone to give 6-chloromethyl-16α,17α-isopropylidenedioxypregna-4,6-diene - 3,20-dione as needles, M.P. 205° C., decomp., $[\alpha]_D^{24}$+61.4° (c., 1.0 in chloroform), $\lambda_{max.}$ 280 mμ ($\epsilon$, 23,000).

EXAMPLE 11

17α-acetoxy-6-bromomethylpregna-4,6-diene-3,20-dione

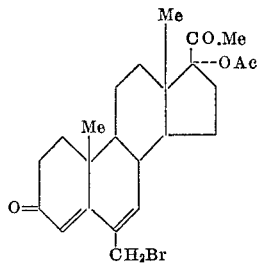

A mixture of 17α-acetoxy-6-methylenepregn-4-ene-3,20-dione (2 g.), acetic acid (80 ml.), N-bromosuccinimide (2 g.) and 60% prechloric acid (1.2 ml.) was stirred at room temperature for 10 minutes. The product, isolated as in Example 1, was 17α-acetoxy-6-bromomethylpregna-4,6-diene-3,20-dione, M.P. 141° C., identical with that obtained in Example 5.

EXAMPLE 12

21-acetoxy-6-bromomethyl-17α-hydroxypregna-4,6-diene-3,11,20-trione

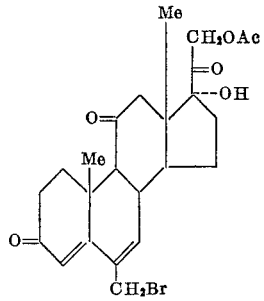

A mixture of 21-acetoxy-17α-hydroxy-6-methylene-pregn-4-ene-3,11,20-trione (1.25 g.), N-bromosuccinimide (1.07 g.), acetic acid (60 ml.) and 60% perchloric acid (0.66 ml.) was stirred at room temperature for 8 minutes. The solution was poured into water and the precipitated solid was crystallised from dichloromethane-methanol to give 21-acetoxy-6-bromomethyl-17α-hydroxy-pregna-4,6-diene-3,11,20-trione as prisms, M.P. 156° C., $[\alpha]_D^{28}$+207.2° (c., 0.35 in chloroform), $\lambda_{max.}$ 280 mμ ($\epsilon$, 22,000).

We claim:
1. A process for the preparation of steroidal 6-halomethyl-4,6-dien-3-ones including the partial formula

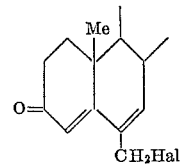

(I)

where Hal is selected from the group consisting of chlorine, bromine and iodine which process comprises reacting the corresponding steroidal 6-methylen-4-en-3-one including the partial formula

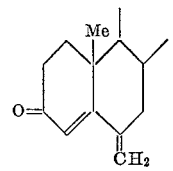

(II)

with a hypohalous acid.

2. A process as claimed in claim 1 wherein the hypohalous acid is generated in situ.

3. A process for the preparation of steroidal-6-halomethyl- 4,6-dien-3-ones according to claim 1 wherein the corresponding 6-methylen-4-en-3-one is dissolved or suspended in an organic solvent and treated with not less than 1 molar equivalent of an N-halo-imide or amide in the presence of a strong acid.

4. A process as claimed in claim 3 wherein the organic solvent is a lower aliphatic ketone, dioxan or acetic acid.

5. A process as claimed in claim 3 wherein the N-haloimide or -amide is the N-chloro, N-bromo or N-ido derivative of acetamide or succinimide.

6. A process as claimed in claim 3 wherein the strong acid is perchloric acid.

7. A process as claimed in claim 3 wherein the strong acid is sulphuric acid or toluene-p-sulphonic acid.

8. 17$\beta$-acetoxy-6-iodomethylandrosta-4,6-dien-3-one.

References Cited
UNITED STATES PATENTS 3,189,604   6/1965   Beal et al. _____ 260—239.55

ELBERT L. ROBERTS, *Primary Examiner.*